(12) United States Patent
Liu et al.

(10) Patent No.: US 6,180,013 B1
(45) Date of Patent: Jan. 30, 2001

(54) METHOD FOR REMOVING SEDIMENTS UNDER SEWAGE WATER IN A SEWER

(76) Inventors: Jen-Jui Liu, No. 16, Tsao-Ya-Chung-I Lane, Chien-Chen Dist., Kaohsiung City; Chyi-Yih Liu; Jiin-Huey Liu, both of No. 167, Jen-I St., Wan-Nei Tsun, Jen-Wu Hsiang, Kaohsiung Hsien, all of (TW)

(*) Notice: Under 35 U.S.C. 154(b), the term of this patent shall be extended for 0 days.

(21) Appl. No.: 09/334,874

(22) Filed: Jun. 17, 1999

(51) Int. Cl.[7] .................................................. B01D 37/00
(52) U.S. Cl. ........................................ 210/747; 210/767
(58) Field of Search .................................. 210/747, 767, 210/773, 170, 319, 525, 526; 37/317, 318, 332, 338; 366/607; 405/163

(56) References Cited

U.S. PATENT DOCUMENTS

| 2,711,598 | * | 6/1955 | Craggs, Jr. . | |
| 4,279,754 | * | 7/1981 | Pollock | 210/747 |
| 4,312,762 | * | 1/1982 | Blackburn et al. | 210/768 |
| 4,724,088 | * | 2/1988 | Zetterland | 210/525 |
| 4,818,390 | * | 4/1989 | Manchak, Jr. | 210/170 |
| 4,957,622 | * | 9/1990 | Mims | 210/170 |
| 5,250,199 | * | 10/1993 | Haag | 210/170 |
| 5,460,727 | * | 10/1995 | Davis | 210/525 |

* cited by examiner

Primary Examiner—David A. Simmons
Assistant Examiner—Frank M. Lawrence
(74) Attorney, Agent, or Firm—Ladas and Parry

(57) ABSTRACT

A method for removing sediments under sewage water in a sewer includes: introducing a portion of a cable into a sewer from the ground by extending the cable into the sewer through an inlet in the ground accessible to the sewer and out of the sewer through an outlet in the ground communicated with the sewer; lowering the portion of the cable until the portion of the cable is embedded in the sediments; positioning two ends of the cable extending outwardly of the inlet and the outlet on the ground; moving mechanically the cable to stir and suspend the sediments into the sewage water; pumping the suspended sediments from the sewer to the ground through one of the inlet and the outlet; removing the sediments from the sewage water by filtration on the ground; and returning the sewage water to the sewer through the other one of the inlet and the outlet.

9 Claims, 8 Drawing Sheets

METHOD FOR REMOVING SEDIMENTS UNDER SEWAGE WATER IN A SEWER

BACKGROUND OF THE INVENTION

1. Field of the Invention

This invention relates to a method for removing sediments under sewage water in a sewer, more particularly to a sediment-removing method that can be carried out conveniently and quickly.

2. Description of the Related Art

In the past, with reference to FIG. 1, sediments 18 under sewage water 19 in a sewer 11 are removed by a digger 10. Digging a number of large holes 14 (only one is shown in FIG. 1) in the ground or road 12 in order to permit access of the digger 10 into the sewer 11 is required before removing the sediments 18. After the sediments 18 are dug out by the digger 10 from the sewer 11 through the large holes 14, the large holes 14 on the road 12 must be closed in preparation for use by the vehicles.

Referring to FIG. 2, a steel plate 15 is disposed on top of support walls 13 that are provided between the sewer 11 and the road 12. Then, a concrete layer 16 and an asphalt layer 17 are formed sequentially above the steel plate 15 in order to close a large hole 14. It is noted that the conventional process for removing the sediments 18 from the sewer 11 is troublesome and time-consuming.

SUMMARY OF THE INVENTION

The object of the present invention is to provide a method for removing sediments under sewage water in a sewer, which can be carried out conveniently and quickly.

According to the present invention, the method for removing sediments under sewage water in a sewer, comprises:

introducing a portion of a cable into a sewer from the ground by extending the cable into the sewer through an inlet in the ground accessible to the sewer and out of the sewer through an outlet in the ground communicated with the sewer;

lowering the portion of the cable until the portion of the cable is embedded in the sediments;

positioning two ends of the cable extending outwardly of the inlet and the outlet on the ground;

moving mechanically the cable to stir and suspend the sediments into the sewage water;

pumping the suspended sediments from the sewer to the ground through one of the inlet and the outlet;

removing the sediments from the sewage water by filtration on the ground; and returning the sewage water to the sewer through the other one of the inlet and the outlet.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
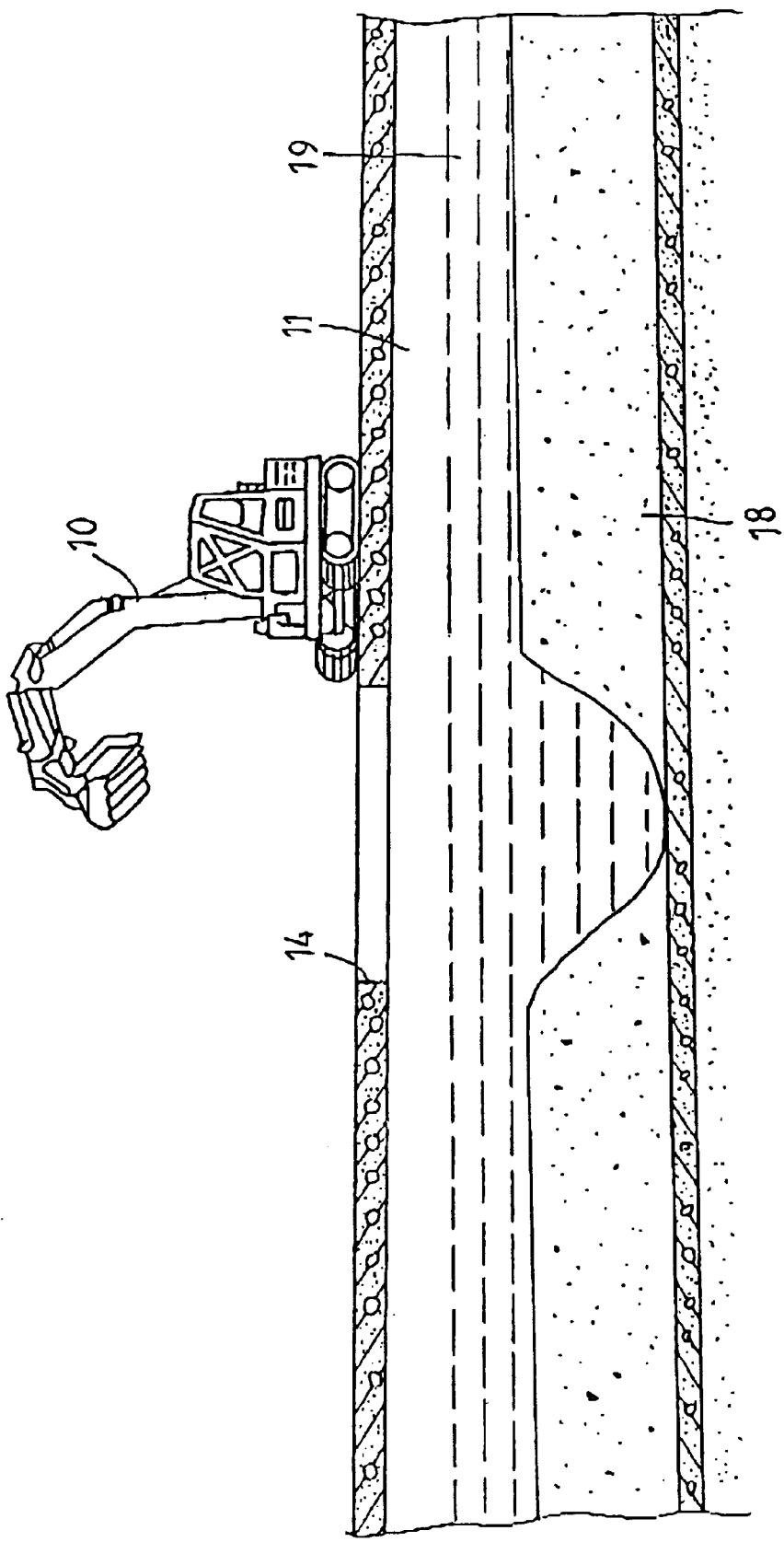
FIG. 1 is a sectional schematic view illustrating a conventional sewer and a large hole that is formed in the road and that is communicated with the sewer.
Figure 2:
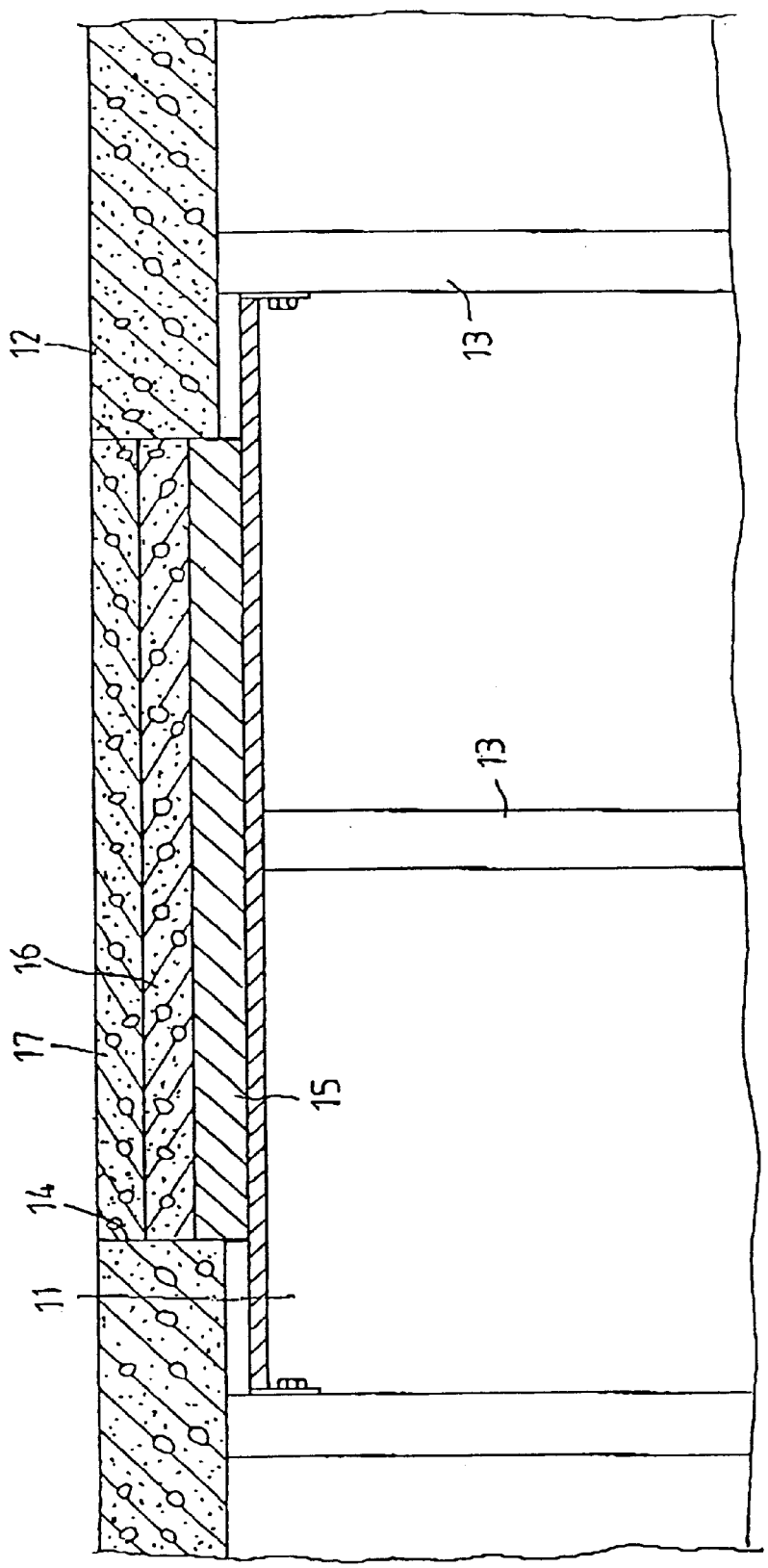
FIG. 2 is an enlarged fragmentary sectional view illustrating the conventional sewer of FIG. 1, in which the large hole in the road is closed.
Figure 3:
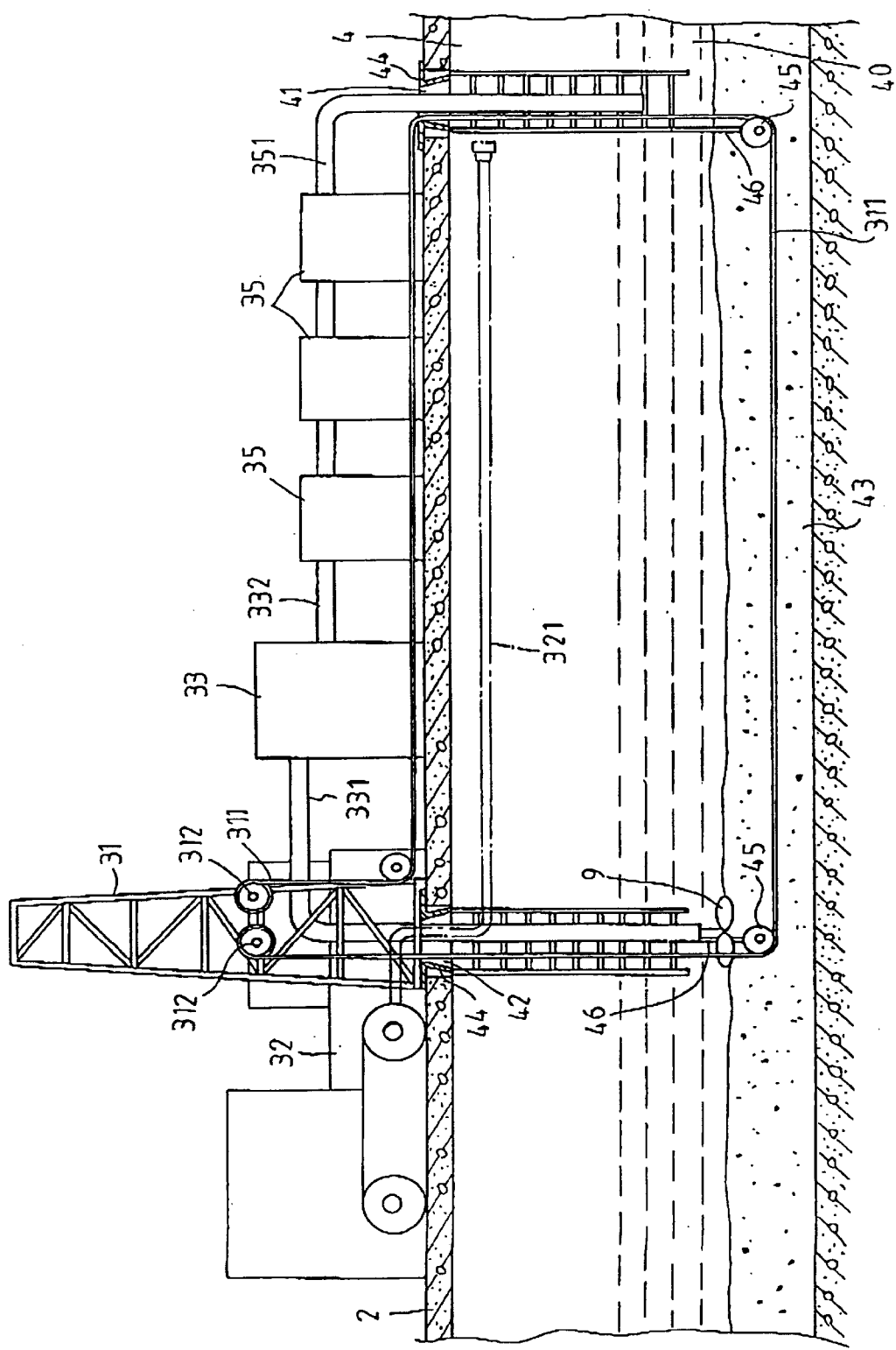
FIG. 3 is a sectional schematic view illustrating how a first preferred embodiment of a method for removing sediments under sewage water in a sewer is performed according to the present invention.

With reference to FIG. 3, a first preferred embodiment of a method for removing sediments 43 under sewage water 40 in a sewer 4 according to the present invention is performed as described hereinbelow. In the first step of the method, an inlet 42 and an outlet 41 are provided in the ground or road 2 in order to communicate the sewer 4 either by drilling the ground 2 or by opening manhole covers (not shown). A steel cable 311 is introduced into the sewer 4 via the inlet 42 and is guided to extend out of the sewer 4 via the outlet 41 by means of a guiding tube 321 of guiding means 32 that is disposed on the ground 2. After the cable 311 is extended out of the sewer 4 from the outlet 41, the guiding tube 321 is wound and retracted into the guiding means 32. Two guide rollers 45 are connected respectively to lower ends of two upright rods 46 and are lowered respectively through the inlet 42 and the outlet 41 to depress and retain a portion of the cable 31 within the sediments 43. A pumping device 33 is disposed on the ground 2, and has a suction pipe 331 extending into sediments 43 though the inlet 42 and an exhaust pipe 332 connected to filtration units 35. The filtration units 35 are connected in series, and have a discharge pipe 351 extending into the sewer 4 through the outlet 41.

Two ends of the cable 311 that extend outwardly of the inlet 42 and the outlet 41 in the ground are connected to two winding rollers 312 that are mounted on a winding engine 31. The cable 311 is moved by rotating the winding rollers 312 to wind up and unwind the cable 311 on the winding rollers 312. As the cable 311 is reciprocated by the winding engine 31, the cable 311 stirs and suspends the sediments 43 into the sewage water 40. Preferably, two cone-shaped members 44 are provided respectively in the inlet 42 and the outlet 41 in order to reduce friction between the cable 311 and the inlet 42 and the outlet 41. Thereafter, the suspended sediments are pumped to the filtration units 35 from the sewer 4 through the suction pipe 331 and the exhaust pipe 332 of the pumping device 33. An agitator 9 is mounted on the lower end of the suction pipe 331 in order to further stir the suspended sediments 43 in the sewage water 40 and to form fine sediment particles that can be pumped smoothly to the filtration units 35 through the suction pipe 331. Finally, the filtrated sewage water is returned to the sewer 4 through the discharge pipe 351 that extends through the outlet 41 in the ground 2. In this way, the sediments 43 in the sewer 4 can be removed.

Figure 4:
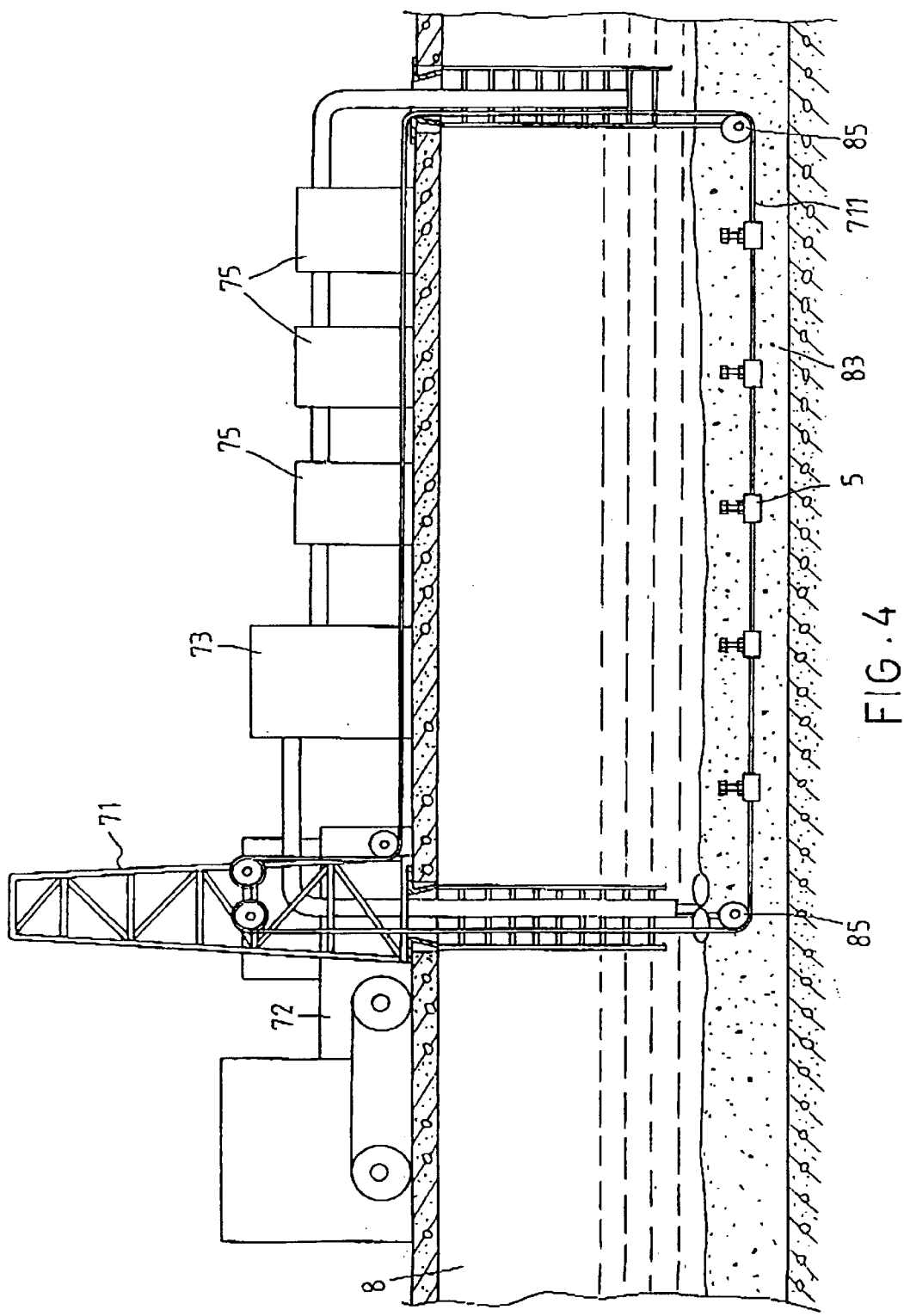
FIG. 4 is a sectional schematic view illustrating how a second embodiment of a method for removing sediments under sewage water in a sewer is performed according to the present invention.

Referring to FIG. 4, a second preferred embodiment of the method for removing sediments 83 in the sewer 8 according to the present invention is shown. In this embodiment, the steps of the method are the same as those of the method of the first preferred embodiment. The equipment that is employed in this embodiment is similar to that of the first embodiment and includes a winding engine 71, a steel cable 711, guiding means 72 and filtration units 75. The difference between the first and second preferred embodiments resides in that a plurality of a raking elements 5 are connected to the portion of the cable 711 that is embedded in the sediment 83.

Figure 5:
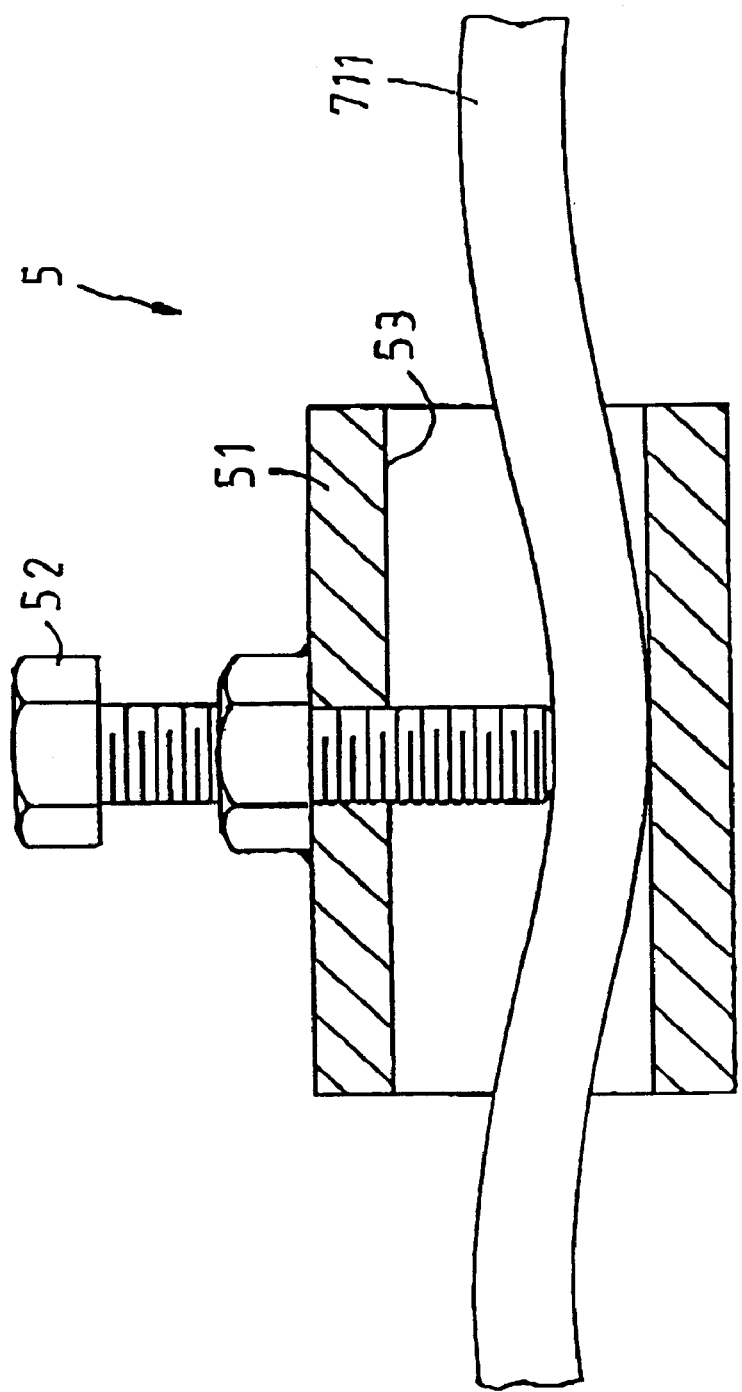
FIG. 5 is an enlarged sectional view illustrating a raking element employed in the second preferred embodiment.

Referring to FIG. 5, each of the raking elements 5 includes a body 51 and a fastener 52 lockable on the body 51. The body 51 of each of the raking elements 5 has a through hole 53 through which the cable 711 extends. The bodies 51 of the raking elements 5 can be secured spacedly on the portion of the cable 711 by means of the fasteners 52, such as locking bolts. It is noted that the raking elements 5 are attached to the cable 711 before the portion of the cable 711 is lowered to the sediments 83 and before depressing and retaining the portion of the cable 711 within the sediments 83 by means of two guiding rollers 85. The raking elements S rake the sediments 83 in the sewer 8 as the cable 711 is moved in order to facilitate suspension of the sediments 83.

Figure 6:
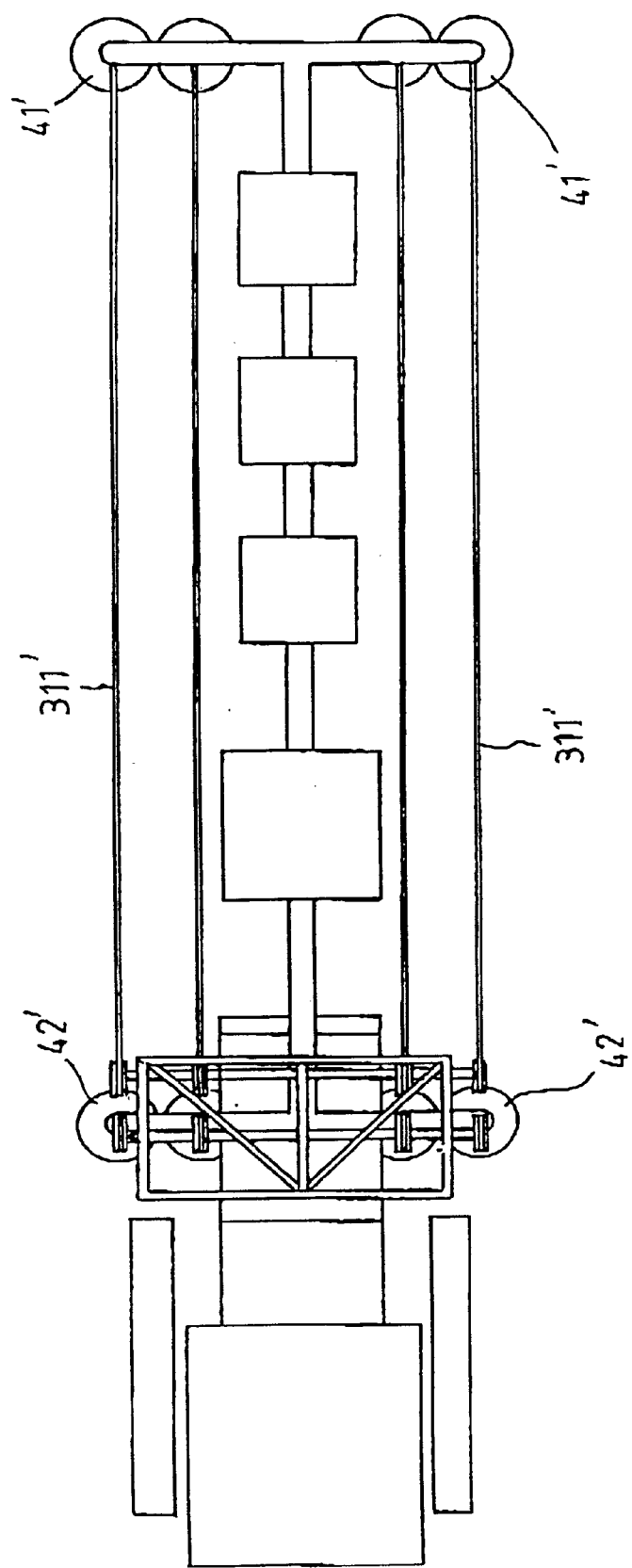
FIG. 6 is a top view of a third preferred embodiment of the method according to the present invention.

Referring to FIG. 6, a third preferred embodiment of the method according the present invention is shown. In this embodiment, four opposed pairs of inlets and outlets 42', 41' are provided in the ground to communicate with the sewer. Each pair of inlets and outlets 42', 41' has a cable 311' passing therethrough. In this way, the area stirred by the cables 311' in the sewer is greater than that stirred by a single cable 311, 711 in the previous embodiments, thereby resulting in an enhanced effect for removing the sediments.

Figure 7:
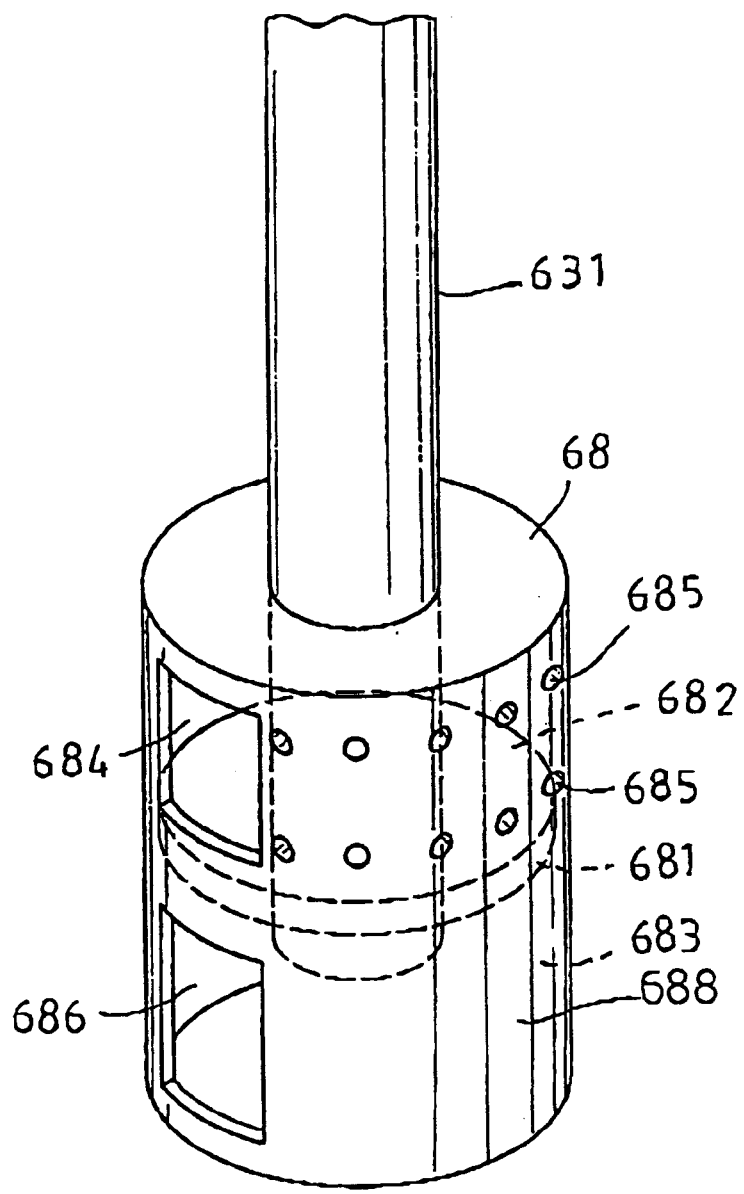
FIG. 7 is a fragmentary perspective view of a hollow tank employed in a fourth preferred embodiment of the method according to the present invention.

Referring to FIG. 7, a cylindrical hollow tank 68 connected to a suction pipe 631 of a pumping device (not shown) of a fourth preferred embodiment according to the present invention is shown to include a partition 681 provided therein, upper and lower chambers 682, 683 formed therein and divided by the partition 681, a cylindrical wall 688, first and second openings 684, 686 formed in the cylindrical wall 688 and communicated respectively with the upper and lower chambers 682, 683, and a plurality of apertures 685 formed in the cylindrical wall 688 opposite to the first opening 684. The lower end of the suction pipe 631 extends into the lower chamber 683 through the upper chamber 682 and the partition 681.

Figure 8:
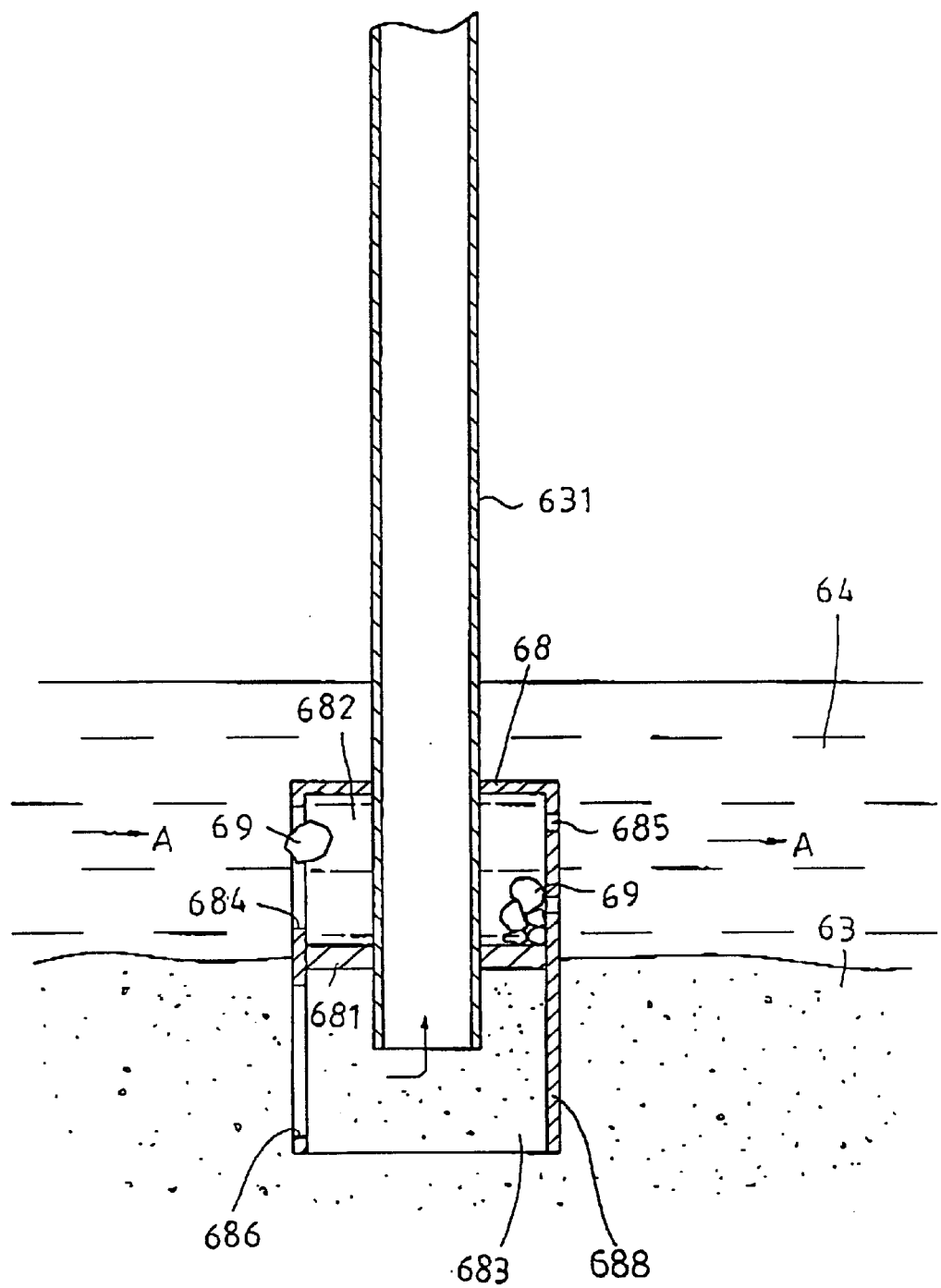
FIG. 8 is a sectional view illustrating how the hollow tank of FIG. 7 is operated according to the present invention.

Referring to FIG. 8, when in use, the lower chamber 683 of the hollow tank 68 is embedded in the sediments 63 in the sewer (not shown) to permit the sediments 63 to be pumped to the filtration units (not shown) through the suction pipe 631. As shown, the upper chamber 682 of the hollow tank 68 is dipped in the sewage water 64, and the first opening 684 is disposed upstream of the apertures 685 in the cylindrical wall 688. The flowing direction of the sewage water 64 is indicated by the arrows (A). As such, plankton 69 in the sewage water 64 can flow into the upper chamber 682 through the first opening 684 and can be retained within the upper chamber 682. Therefore, the suction pipe 631 will not be blocked by the plankton 69. After the pumping operation is done, the suction tube 631 is retracted from the sewer to remove the plankton 69 from the upper chamber 682 of the hollow tank 68.

Since no large holes need are needed to be dug in the ground or road and to be closed in the manner described in the prior art, the method for removing sediments under sewage water in a sewer according to the present invention can be carried out conveniently and quickly.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

We claim:

1. A method for removing sediments under sewage water in a sewer, comprising:
    introducing a portion of a cable into a sewer from a ground surface by extending said cable into the sewer through an inlet in the ground accessible to the sewer and out of the sewer through an outlet in the ground communicated with the sewer;
    lowering said portion of said cable until said portion of said cable is embedded in the sediments;
    positioning two ends of said cable extending outwardly of said inlet and said outlet on the ground;
    moving mechanically said cable to stir and suspend the sediments into the sewage water;
    pumping the suspended sediments from the sewer to the ground through one of said inlet and said outlet;
    removing the sediments from the sewage water by filtration on the ground; and
    returning the sewage water to the sewer through the other one of said inlet and said outlet.

2. The method as claimed in claim 1, wherein said ends of said cable are connected to two winding rollers, and said cable is moved by rotating said winding rollers to wind up and unwind said cable.

3. The method as claimed in claim 2, further comprising the step of lowering at least two guide rollers through said inlet and said outlet, respectively, and positioning said guide rollers in the sediments to depress and retain said cable within the sediments.

4. The method as claimed in claim 3, wherein said guide rollers are positioned to lower ends of upright rods which extend into the sediments through said inlet and said outlet.

5. The method as claimed in claim 1, further comprising the step of providing a plurality of spaced raking elements on said cable.

6. The method as claimed in claim 1, wherein the suspended sediments are pumped by a pumping device in the pumping step, said pumping device having a suction pipe extending into the sediments.

7. The method as claimed in claim 6, wherein said suction pipe has a lower end that extends into the sediments, and an agitator mounted adjacent to said lower end thereof in order to further stir the suspended sediments in the sewage water.

8. The method as claimed in claim 6, wherein said lower end of said suction pipe has a cylindrical hollow tank fixed thereto, said hollow tank having a partition provided therein, upper and lower chambers formed therein and divided by said partition, a cylindrical wall, first and second openings formed in said cylindrical wall and communicated respectively with said upper and lower chambers, and a plurality of apertures formed in said cylindrical wall opposite to said first opening, said lower end of said suction pipe extending into said lower chamber through said upper chamber and said partition.

9. The method as claimed in claim 1, further comprising the step of providing cone-shaped members in said inlet and said outlet respectively in order to reduce friction between said cable and said inlet and said outlet.

* * * * *